(12) United States Patent
Ziemer et al.

(10) Patent No.: US 8,734,758 B2
(45) Date of Patent: *May 27, 2014

(54) METHOD FOR PREPARING MOLECULAR SIEVES

(75) Inventors: James N. Ziemer, Martinez, CA (US); Tracy M. Davis, Pinole, CA (US); Stacey I. Zones, San Francisco, CA (US); Adeola Ojo, Pleasant Hill, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 425 days.

This patent is subject to a terminal disclaimer.

(21) Appl. No.: 12/940,785

(22) Filed: Nov. 5, 2010

(65) Prior Publication Data

US 2012/0114552 A1    May 10, 2012

(51) Int. Cl.
*C01B 39/02* (2006.01)

(52) U.S. Cl.
USPC ............................................. 423/700

(58) Field of Classification Search
USPC .................................... 423/700–718
See application file for complete search history.

(56) References Cited

U.S. PATENT DOCUMENTS

| | | | |
|---|---|---|---|
| 4,578,371 A | 3/1986 | Rieck et al. | |
| 4,849,194 A * | 7/1989 | Krishnamurthy et al. | 423/700 |
| 4,935,215 A | 6/1990 | Krishnamurthy | |
| 5,053,373 A * | 10/1991 | Zones | 502/64 |
| 6,872,680 B2 * | 3/2005 | Chang et al. | 502/64 |
| 7,390,763 B2 | 6/2008 | Zones et al. | |
| 8,545,805 B2 * | 10/2013 | Zones et al. | 423/706 |
| 2006/0293176 A1 | 12/2006 | Chang et al. | |
| 2007/0191660 A1 * | 8/2007 | Johnson et al. | 585/467 |
| 2009/0082545 A1 | 3/2009 | Chang et al. | |
| 2010/0116034 A1 | 5/2010 | Abbott et al. | |
| 2010/0121583 A1 | 5/2010 | Abbott et al. | |

FOREIGN PATENT DOCUMENTS

GB    2005653 A    *    4/1979

OTHER PUBLICATIONS

Gresham. viscosity, fluids resistance to flow, 2008, lubrication fundamentals.*
Follens, Viscosity sensing in heated alkaline zeolite synthesis media, 2009, Physical Chemistry Chemical Physics, 2854-2856.*
I.M. Krieger and T.J. Dougherty, "A mechanism for non-Newtonian flow in suspensions of rigid spheres," Trans. Soc. Rheology, 3, 137-152, (1959).
J. L. Casci and B.M. Lowe, "Use of pH-measurements to monitor zeolite crystallization," Zeolites, 3, 186-187, (1983).
B. M. Lowe, "An equilibrium model for the crystallization of high silica zeolites," Zeolites, 3, 300-305, (1983).
S.I. Zones, "Synthesis of pentasil zeolites from sodium silicate solutions in the presence of quaternary imidazole compounds," Zeolites, 9, 458-467, (1989).

(Continued)

*Primary Examiner* — Melvin C Mayes
*Assistant Examiner* — Stefanie Cohen
(74) *Attorney, Agent, or Firm* — Terrence Flaherty; E. Joseph Gess (57) ABSTRACT

A method for synthesizing a molecular sieve comprising providing a reaction mixture sufficient to synthesize the molecular sieve, maintaining the reaction mixture under crystallization conditions, monitoring at least one viscometric parameter of the reaction mixture, and determining an endpoint based on the monitoring of the at least one viscometric parameter.

6 Claims, 5 Drawing Sheets

(56) References Cited

OTHER PUBLICATIONS

S. Yang and A. Navrotsky, "An in situ calorimetric study of zeolite crystallization kinetics," Microporous Mesoporous Mater., 52, 93-103, (2002).

S.I. Zones and S-J. Hwang, "The inorganic chemistry of guest-mediated zeolite crystallization: a comparison of the use of boron and aluminum as lattice-substituting components in the presence of a single guest molecule during zeolite synthesis," Microporous Mesoporous Mater., 58, 263-277, (2003).

R. Herrmann, W. Schwieger, O. Scharf, C. Stenzel, H. Toufar, M. Schmachtl, B. Ziberi, and W. Grill, "In situ diagnostics of zeolite crystallization by ultrasonic monitoring," 80, 1-9, (2005).

Q. Liu and A. Navrotsky, "Synthesis of nitrate sodalite: An in situ scanning calorimetric study," Geochim. Cosmochim. Acta, 71, 2072-2078, (2007).

G. Cao and M.J. Shah, "In situ monitoring of zeolite crystallization by electrical conductivity measurement: New insight into zeolite crystallization mechanism," Microporous Mesoporous Mater.,101, 19-23, (2007).

A.W. Burton, K. Ong, T. Rea, and I.Y. Chan, "On the estimation of average crystallite size of zeolites from the Scherrer equation: A critical evaluation of its application to zeolites with one-dimensional pore systems," Microporous Mesoporous Mater., 117, 75-90, (2009).

L.R.A. Follens, E.K. Reichel, C. Riesch, J. Vermant, J.A. Martens, C.E.A. Kirschhock, and B. Jakoby, "Viscosity Sensing in Heated Alkaline Zeolite Synthesis Media," Phys. Chem. Chem. Phys.,11, 2854-2857, (2009).

PCT International Search Report, PCT/US2011/046211, mailed Apr. 9, 2012.

L.R.A. Follens, E.K. Reichel, C. Riesch, J. Vermant, J.A. Martens, C.E.A. Kirschhock, and B. Jackoby "Viscosity sensing in heated alkaline zeolite synthesis media" Phys. Chem. Chem. Phys. 2009, 11, 2854-2857.

J.L. Casci and B.M. Lowe "Use of pH-measurements to monitor zeolite crystallization" Zeolites 1983, 3, 186-187.

\* cited by examiner

METHOD FOR PREPARING MOLECULAR SIEVES

TECHNICAL FIELD

The invention relates generally to methods for synthesizing molecular sieves.

BACKGROUND

Molecular sieves are an important class of materials used in the chemical industry for processes such as gas stream purification and hydrocarbon conversions. Molecular sieves are porous solids having interconnected pores of different sizes. Molecular sieves typically have a one-, two- or three-dimensional crystalline pore structure that selectively adsorb molecules that can enter the pores and exclude those molecules that are too large.

The pore size, pore shape, interstitial spacing or channels, composition, crystal morphology and structure are a few characteristics of molecular sieves that determine their use in various hydrocarbon adsorption and conversion processes.

During synthesis, the reagents are mixed to form a "gel" that may be aged at a temperature for a given period before reacting for a time to provide a crystalline molecular sieve. Conventional processes used in the synthesis of these materials may employ reactors or autoclaves for step-wise mixing, gel aging and final crystallization of the product. Molecular sieves may also be produced in a continuous process. Due to the costs associated with such crystallizers, it is advantageous to maximize the output of each unit, which conventionally can be accomplished in two ways: minimize crystallization time or maximize yield.

In order to minimize crystallization time, it is customary to monitor the degree of crystallization so that the reaction may be terminated as soon as the product achieves a requisite yield. Conventionally, the termination point is determined by withdrawing a sample of the reaction mixture and measuring its crystallinity by powder X-ray diffraction (XRD) of a dried sample. This is relatively intensive in terms of its requirements in time and labor, and is generally not suitable for monitoring the progress of crystallization since it does not provide results rapidly enough to permit satisfactory control of the process variables.

Typically, methodologies for determining the appropriate reaction period are directed more to maximizing product yield, rather than to achieving other properties such as a particular crystal size. Further, the maximum product yield is often reached long before the reaction period is terminated, thereby unnecessarily consuming time and resources, and sometimes yielding unwanted by-product phases. Batch-to-batch process variations may also yield inconsistent physical properties between batches. In the absence of a reliable method for determining the endpoint of the synthesis, the reaction mixture may be heated for an unnecessarily prolonged period of time with the concomitant production of undesirably large crystals. It would be desirable to have a method for monitoring the progress of the crystallization, for batch and continuous molecular sieve synthesis processes that could provide information on crystallization more rapidly than conventional powder XRD analysis.

It would also be desirable to monitor the progress of molecular sieve crystallization such that the endpoint of the synthesis reaction could be predicted in advance of the actual endpoint. The early determination of the reaction endpoint would allow the synthesis process to be stopped at a time when the molecular sieve crystals are at their most desirable, for example, with respect to crystal size.

Therefore, there is a need for methods for monitoring crystallization during molecular sieve synthesis that allow the early detection of the endpoint of the reaction, thereby enabling the consistent and reliable production of molecular sieves having desirable characteristics, in the minimum amount of time and with maximum energy efficiency.

SUMMARY OF THE INVENTION

In one aspect, the invention is directed to a method for synthesizing a molecular sieve comprising: providing a reaction mixture sufficient to synthesize the molecular sieve; maintaining the reaction mixture under crystallization conditions; monitoring at least one viscometric parameter of the reaction mixture; and determining an endpoint based on the monitoring of the at least one viscometric parameter.

In another aspect, the invention is directed to a method for monitoring crystallization of a molecular sieve from a reaction mixture during a molecular sieve synthesis process, the method comprising: monitoring at least one viscometric parameter of the reaction mixture; and determining an endpoint of the molecular sieve synthesis process.

DETAILED DESCRIPTION

The following terms will be used throughout the specification and will have the following meanings unless otherwise indicated.

The term "measured viscosity" refers to a value for the viscosity of a fluid such as a reaction mixture for molecular sieve synthesis as recorded, determined or measured, for example, using an instrument such as a rheometer. The measured viscosity of a sample removed from the reaction mixture at a given time point may be different from the actual viscosity of the reaction mixture in situ at that time point due, for example, to differences in the dynamics of crystallite aggregation and disaggregation in a reactor and in a sample removed from the reactor. Nonetheless, changes over time of measured viscosity of samples of the reaction mixture have been found by the applicant to have predictive value in determining the endpoint of molecular sieve syntheses. The terms "measured viscosity" and "apparent viscosity" may be used herein interchangeably and synonymously.

The term "viscosity shear rate index" refers to a measure of the departure from Newtonian flow characteristics of a fluid, such as a reaction slurry for molecular sieve synthesis. The degree of departure from Newtonian fluid behavior may be quantified by assuming a Herschel-Bulkley flow model, where the relationship between shear stress (σ) and shear rate (γ) is given by:

$$\sigma \alpha \gamma^n$$

The Herschel-Bulkley exponent, or viscosity shear rate index (η), can be determined by fitting a straight line to a plot of the natural log of the shear stress (Pascals; y-axis) versus the natural log of the shear rate ($s^{-1}$; x-axis) data. The term viscosity shear rate index may be abbreviated herein as "rate index."

The term "endpoint" refers to the stage of the reaction or process when the target product has been formed and has attained at least one desired product characteristic or attribute, for example, in terms of crystal size, physical properties, catalytic activity, yield, and the like. For a given product and synthesis process, the endpoint may vary depending on the desired product attribute(s), for example, in relation to the intended use(s) for the product.

The term "reaction time" refers to the elapsed time from a point when the reaction mixture has attained the designated or target reaction temperature; for example, for a reaction mixture having an eight-hour ramp from ambient to reaction temperature, the end of the eight-hour ramp period represents reaction time zero. The terms "reaction time" and "time on stream" may be used herein interchangeably and synonymously.

In accordance with the present invention, there is provided a method for synthesizing a molecular sieve comprising: providing a reaction mixture sufficient to synthesize the molecular sieve; maintaining the reaction mixture under crystallization conditions; monitoring at least one viscometric parameter of the reaction mixture; and determining an endpoint based on the monitoring of the at least one viscometric parameter.

The method of the present invention can be used to make a variety of molecular sieves. Non-limiting examples include the zeolites and their zeotypes having the framework types described in *Atlas of Zeolite Framework Types*, Ch. Baerlocher, L. B. McCusker and D. H. Olson, 6th revised edition, Elsevier, Amsterdam (2007), including physical mixtures and framework intergrowths thereof.

In general, a molecular sieve may be prepared by contacting under crystallization conditions a reaction mixture comprising: (1) at least one source of at least one oxide of a tetravalent element (Y); (2) optionally, one or more sources of one or more oxides selected from the group consisting of oxides of trivalent elements, oxides of pentavalent elements, and mixtures thereof (W); (3) hydroxide ions; and (4) a structure directing agent (SDA).

Molecular sieves synthesized using methods of the present invention typically contain one or more tetravalent framework elements (Y), and optionally a trivalent element, a pentavalent element, or a mixture thereof (W), and are represented by the molar ratio (m) relationship:

$$m=YO_2/W_2O_a$$

wherein: Y is selected from the group consisting of tetravalent elements from Groups 4 to 14 of the Periodic Table, and mixtures thereof; W is selected from the group consisting of trivalent elements and pentavalent elements from Groups 3 to 13 of the Periodic Table, and mixtures thereof; and stoichiometric variable a equals the valence state of compositional variable W (that is, when W is trivalent, a=3; and when W is pentavalent, a=5)

The ratio of Y to W (for example, silica to alumina for zeolites) may vary according to a particular intended end-use application for the molecular sieve. In one embodiment, the molecular sieve may have a high concentration of tetravalent elements (for example, a high-silica sieve) in which (m) has a high value, typically from 20 to ∞. In another embodiment, the molecular sieve may have a high concentration of trivalent and/or pentavalent elements (for example, a high-alumina sieve) in which the molar ratio (m) has a value of less than 4.

The product obtained from the synthesis will depend, naturally, upon the selected synthesis system and may be, for example, a small pore size molecular sieve such as SSZ-13, SSZ-16, SSZ-36, SSZ-39, SSZ-50, SSZ-52, or SSZ-73; an intermediate pore size molecular sieve such as SM-3, SM-6, SSZ-32, ZSM-5, ZSM-11, ZSM-12, ZSM-22, ZSM-23, ZSM-35, ZSM-38, ZSM-48, or ZSM-57; or a large pore molecular sieve such as zeolite Y, SSZ-26, SSZ-33, SSZ-64, ZSM-4 or ZSM-20. The invention is not limited to any particular type of zeolites or molecular sieves.

Y may be selected from the group consisting of Ge, Si, Ti, and mixtures thereof. In one embodiment, Y may be selected from the group consisting of Ge, Si, and mixtures thereof. In another embodiment, Y is Si. Sources of elements selected for composition variable Y include oxides, hydroxides, acetates, oxalates, ammonium salts and sulfates of the element(s) selected for Y. In one embodiment, each source(s) of the element(s) selected for composition variable Y is an oxide. Where Y is Si, sources useful herein for Si include fumed silica, precipitated silicates, silica hydrogel, silicic acid, colloidal silica, tetra-alkyl orthosilicates (for example, tetraethyl orthosilicate), and silica hydroxides. In one embodiment, sources useful herein for Si include alumina-coated silica nanoparticle sols. Sources useful herein for Ge include germanium oxide and germanium ethoxide.

W may be selected from the group consisting of elements from Groups 3 to 13 of the Periodic Table. In one embodiment, W is selected from the group consisting of Ga, Al, Fe, B, In, and mixtures thereof. In another embodiment, W is selected from the group consisting of Al, B, Fe, Ga, and mixtures thereof. Sources of elements selected for optional composition variable W include oxides, hydroxides, acetates, oxalates, ammonium salts and sulfates of the element(s) selected for W. Where W is Al, typical sources of aluminum oxide include aluminates, alumina, and aluminum compounds such as $AlCl_3$, $Al_2(SO_4)_3$, $Al(OH)_3$, kaolin clays, and other zeolites.

Metalloaluminophosphate molecular sieves can be synthesized using the process of this invention. In one embodiment, metalloaluminophosphate molecular sieves may be represented by the empirical formula, on an anhydrous basis, mR: $(M_xAl_yP_z)O_2$, wherein R represents at least one structure directing agent; m is the number of moles of R per mole of $(M_xAl_yP_z)O_2$ and m has a value from 0 to 1; and x, y, and z represent the mole fraction of Al, P and M, where M is a metal selected from Groups 1 to 10 of the Periodic Table. In one embodiment, M is selected from the group consisting of Si, Ge, Co, Cr, Cu, Fe, Ga, Mg, Mn, Ni, Sn, Ti, Zn, Zr, and mixtures thereof. In one embodiment, m is greater than or equal to 0.2, and x, y and z are greater than or equal to 0.01. In another embodiment, x is from 0.01 to 0.2, y is from 0.4 to 0.5, and z is from 0.3 to 0.5.

The metalloaluminophosphate molecular sieves include silicoaluminophosphate (SAPO) molecular sieves, aluminophosphate (AlPO) molecular sieves, and metal substituted forms thereof. Non-limiting examples of SAPO and AlPO molecular sieves under the present invention include molecular sieves selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, AlPO-5, AlPO-11, AlPO-18, AlPO-31, AlPO-34, AlPO-36, AlPO-37, AlPO-46, metal containing molecular sieves thereof, and mixtures thereof. In one embodiment, the molecular sieve is selected from the group consisting of SAPO-18, SAPO-34, SAPO-35, SAPO-44, SAPO-56, AlPO-18 AlPO-34, metal containing molecular sieves thereof, and mixtures thereof.

Depending on the particular target molecular sieve, a structure directing agent (SDA) may be employed in order to promote crystallization of the target product. As is well known by those skilled in the art, the particular SDA used in the synthesis of a molecular sieve may be selected according to the particular target molecular sieve.

It will be understood by a person skilled in the art that the molecular sieves described herein may contain impurities, such as amorphous materials, unit cells having framework topologies which do not coincide with the molecular sieve, and/or other impurities (for example, certain organic materials).

The reaction mixture is maintained under crystallization conditions, for example, at an elevated temperature. Reaction conditions include a temperature in the range generally from 125° C. to 220° C., typically from 150° C. to 200° C., and often from 160° C. to 180° C. The reaction may be carried out under hydrothermal conditions. In one embodiment, the reaction may be performed in an autoclave so that the reaction mixture is subject to autogenous pressure. The reaction mixture may be subjected to mild stirring or agitation during the crystallization step, for example, at a rate in the range generally from 140 rpm to 160 rpm.

It is desirable that the reaction mixture contain a minimum amount of reactant solids. In one embodiment, the reaction mixture contains at least 8 wt. % reactant solids. In another embodiment, the reaction mixture contains at least 10 wt. % reactant solids.

During the hydrothermal crystallization step, the molecular sieve crystals can be allowed to nucleate spontaneously from the reaction mixture. The use of crystals of the molecular sieve as seed material can be advantageous in decreasing the time necessary for crystallization to occur and for the synthesis to be completed. In addition, seeding can promote nucleation and/or the formation of the molecular sieve over any undesired phases, leading to an increased purity of the target product. When used as seeds, seed crystals are typically added in an amount between 1% and 10% of the weight of the source for silicon used in the reaction mixture.

During hydrothermal synthesis, the crystals exhibit several distinct stages of growth during which the reaction mixture may change from being a reasonably homogeneous medium comprised, for example, of dispersed colloidal silica and alumina to one that is more heterogeneous where distinct sub-micron molecular sieve crystals which have limited solubility in the parent solution begin to appear. While not being bound by any one particular theory, as the crystallites and their aggregates grow in size and number during the synthesis process, they displace increasingly larger volumes of fluid under flow conditions, thereby causing the overall viscosity of the slurry to increase. See, for example, W. J. Moore, *Physical Chemistry*, 4th Edition, Prentice Hall, p. 946 (1972).

It has been discovered that the extent of crystallization during synthesis can be assessed by monitoring changes in rheological behavior of the reaction slurry under carefully controlled conditions. In the case of concentrated molecular sieve particles growing in an autoclave slurry, the viscometric behavior can be highly complex since the individual crystallites themselves tend to agglomerate into aggregates, thereby greatly increasing the voluminosity (that is, the effective volume) of the molecular sieve material. Such increases in voluminosity due to crystallite agglomeration result in a much higher viscosity of the reaction mixture than would be expected based on the average dimensions of the individual molecular sieve. crystallites alone. See, for example, I. M. Krieger et al., *Trans. Soc. Rheology*, 3, 137-152 (1959) for a discussion on the relationship between particulate voluminosity and solution viscosity.

Furthermore, since the crystal aggregates are only loosely held together, their voluminosities at any given time are dependent on the degree to which the slurry is being mixed or sheared, for example, during stirring in the reactor or during manipulation of samples of the reaction mixture for viscosity measurements. The net result is that the measured viscosity of a sample of the reaction slurry at any given time depends not only on the average size and concentration of the crystallites, but also on a number of other factors including the propensity of the crystallites towards aggregation, the degree of mixing/shearing of the sample at the time of measurement, and the viscosity of the reaction mixture liquid phase (the latter of which is highly temperature dependent). Despite these apparent complexities, and while again not being bound by any one particular theory, applicant has discovered that measurement of at least one viscometric parameter of the reaction mixture under carefully controlled conditions can be used to assess the extent of molecular sieve crystallization in a reaction slurry.

During the reaction, the extent of molecular sieve crystallization may be monitored by measuring, at various time points, at least one viscometric parameter of the reaction mixture. It has been found that during molecular sieve crystallization, certain bulk properties of the reaction mixture vary concurrently with the progression of the molecular sieve synthesis process, thereby permitting the measurement of the reaction mixture bulk properties to form a basis for determining the status of one or more properties of the molecular sieve. Such molecular sieve properties may include the crystallization status of the reaction mixture (crystallite size, degree of crystallite agglomeration) as well as the quantitative product yield, and characteristics related to the catalytic activity of the molecular sieve. Unlike prior art methods used to monitor crystallization during molecular sieve synthesis, methods of the present invention allow measurement of reaction mixture properties readily and either instantaneously or within shorter time periods than those of the prior art, using commercially available equipment. The reaction mixture properties may be measured either in situ, or by withdrawing a sample from the bulk reaction mixture for testing. Such measurements may be made continuously, or intermittently/periodically.

In one embodiment, the at least one viscometric parameter of the reaction mixture is selected from the group consisting of viscosity shear rate index, measured viscosity, and combinations thereof.

As a non-limiting example of reaction monitoring according to the present invention, a sample of a reaction mixture to be monitored for a viscometric parameter is loaded on a rheometer at about ambient temperature, and the sample may be equilibrated on the rheometer at a pre-defined temperature. Equilibration on the rheometer serves to evenly suspend molecular sieve crystallites, or aggregates thereof, to provide a homogeneous sample for rheological analysis. In one embodiment, the sample is equilibrated on the rheometer by subjecting the sample to a pre-defined shear rate, typically in the range of 500 $s^{-1}$ to 1200 $s^{-1}$, usually from 800 $s^{-1}$ to 1100 $s^{-1}$, and often 1000 $s^{-1}$, for a period in the range typically from 30 seconds to 60 seconds.

The present invention is not limited to monitoring molecular sieve synthesis via a rheometer; rather, various secondary or ancillary measurement techniques, methods, protocols, or tools capable of detecting changes in slurry viscosity and/or Newtonian fluid behavior during crystal growth are also within the scope of the present invention. Such secondary tools may include the use of in-line/high pressure viscometers coupled to fluid circulating loops in the autoclave, and vibration analyzers coupled to the autoclave stirrer shaft or exterior.

In one embodiment, a viscosity shear rate index is determined for each of a plurality of samples of the reaction mixture taken at a plurality of time points during the molecular sieve synthesis process. The viscosity shear rate index of each sample of the reaction mixture is quantified or determined, assuming a Herschel-Bulkley flow model, by subjecting the sample to a plurality of shear rates at the pre-defined temperature, and recording a shear stress value corresponding to each of the plurality of shear rates to provide a plurality of shear stress values. Typically, each of the plurality of shear rates may be within the range from $100\ s^{-1}$ to $1000\ s^{-1}$. Thereafter, the viscosity shear rate index (Herschel-Bulkley exponent, $\eta$) for the sample is determined based on the plurality of shear rates and the corresponding plurality of shear stress values, wherein the relationship between shear rate ($\gamma$) and shear stress ($\sigma$) is given by: $\sigma \alpha \gamma^{\eta}$. As an example, the viscosity shear rate index ($\eta$) can be determined by fitting a straight line to a plot of the natural log of the shear stress values ($\ln(\sigma)$, Pascals; y-axis) versus the natural log of the shear rate values ($\ln(\gamma)$, $s^{-1}$; x-axis). Using this model, Newtonian fluids have $\eta=1$, whereas fluids (reaction mix slurries) with weakly agglomerated crystallites, will typically exhibit pseudo-plastic (or shear-thinning) behavior with $\eta<1$. In general, the smaller the viscosity shear rate index of a slurry, the greater its degree of pseudo-plasticity.

In one embodiment, the measured viscosity is determined for each of a plurality of samples of the reaction mixture taken at a plurality of points in time during the molecular sieve synthesis process. The measured viscosity of each sample may be determined via a rheometer by subjecting the sample to at least one shear rate at the pre-defined temperature, and recording at least one shear stress corresponding to the at least one shear rate. Thereafter, the measured viscosity ($\mu$) of the sample may be determined by dividing the shear stress ($\sigma$) by the corresponding shear rate ($\gamma$), namely, $\mu=\sigma/\gamma$. Typically, the at least one shear rate to which the sample is subjected may be in the range from $100\ s^{-1}$ to $1000\ s^{-1}$.

In one embodiment, the monitoring step comprises periodically removing a sample of the reaction mixture, cooling each sample to a pre-defined temperature, and measuring the at least one viscosity parameter of each sample. The frequency at which the reaction mixture is sampled may be hourly or at a greater or lesser frequency. For example, samples may be withdrawn from the reactor at a frequency of once every 10 minutes to 120 minutes, and typically once every 15 minutes to 60 minutes. The cooling of each sample to a pre-defined temperature may be generally in the range from 5° C. to 50° C., typically from 10° C. to 30° C., and often from 15° C. to 25° C. Generally, the viscometric parameter (for example, viscosity shear rate index, or measured viscosity) of each sample is measured within ±0.2° C. of the pre-defined temperature, typically within ±0.1° C., and often within ±0.05° C. of the pre-defined temperature. Thereafter, an endpoint of the molecular sieve synthesis process may be determined based, for example, on a change in measured viscosity of the reaction mixture, viscosity shear rate index of the reaction mixture, and combinations thereof.

In one embodiment, the monitoring step comprises periodically removing a sample of the reaction mixture; subjecting each sample to a plurality of shear rates; recording a shear stress corresponding to each of the plurality of shear rates to provide a plurality of shear stress values, and determining a viscosity shear rate index ($\eta$) for each sample. Accordingly, in one aspect of the present invention, the rheological properties of an autoclave reaction slurry may be related to various stages of molecular sieve crystal growth, for example, with respect to the endpoint of a molecular sieve synthesis process. As a non-limiting example, the degree of crystallization of a molecular sieve from a suitable reaction mixture during the course of a molecular sieve synthesis process can be monitored or assessed by monitoring at least one viscosity-related or viscometric parameter of the reaction mixture. Moreover, an endpoint of the molecular sieve synthesis process can then be determined based on the monitoring of the at least one viscometric parameter of the reaction mixture.

In one embodiment, the endpoint of the molecular sieve synthesis process can be determined at a time preceding the endpoint; that is, the endpoint can be predicted, such that the molecular sieve synthesis reaction can be quenched, and the process stopped at a time that coincides with optimum characteristics of the molecular sieve. As an example, for certain applications including various molecular sieve-catalyzed processes, smaller crystals provide superior results over their larger crystal counterparts. After nucleation in the reactor or autoclave under crystallization conditions, individual crystals of the molecular sieve grow with time and, absent some mechanism for monitoring the extent of crystal growth, may reach a supra-optimal size range. Each XRD analysis of a reaction slurry, as used in conventional monitoring of molecular sieve crystallization, typically takes several hours, after which time the molecular sieve product may have been substantially degraded, for example, by having attained excessively large crystal size. By monitoring a viscometric parameter of the reaction mixture according to an embodiment of the instant invention, the molecular sieve synthesis process can be terminated in a timely manner so as to obtain molecular sieve crystals having the most desirable attributes (for example, small crystal size). In one embodiment, monitoring of molecular sieve crystallization from the reaction mixture can be discontinued after the reaction endpoint has been predicted and prior to the occurrence of the reaction endpoint.

In one embodiment, the endpoint of a molecular sieve process is determined based on the monitoring of at least one viscometric parameter. In one embodiment, the endpoint of the synthesis reaction is determined or predicted based on a particular qualitative or quantitative change in the at least one viscometric parameter of the reaction mixture. Reference herein to "a change" in a reaction mixture parameter, such as measured viscosity or viscosity shear rate index, includes one or more changes or a series of changes that may occur during the course of a reaction or process for synthesizing a molecular sieve or molecular sieve. In one embodiment, the endpoint of the synthesis process is determined based on a change in measured viscosity of the reaction mixture, a change in viscosity shear rate index of the reaction mixture, and combinations thereof. In one embodiment, the at least one viscometric parameter is the measured viscosity of the reaction mixture, and the endpoint of the synthesis reaction may be determined based on a change in the measured viscosity of the reaction mixture. In another embodiment, the at least one viscometric parameter is the viscosity shear rate index of the reaction mixture, and an endpoint of the synthesis reaction is determined based on a change in the monitored viscosity shear rate index. In yet another embodiment, both the viscosity shear rate index and the measured viscosity of the reaction mixture may be monitored during the course of the synthesis process, and the endpoint of the synthesis reaction may be determined based on a change in the combination of both the viscosity shear rate index and the measured viscosity of the reaction mixture.

In one embodiment, the at least one viscometric parameter may be monitored by removing a sample from the reaction mix at each of a plurality of points in time during the course of the molecular sieve synthesis process, and thereafter measuring the viscometric parameter(s) of the samples. In another embodiment, the at least one viscometric parameter of the reaction mixture, for example, the viscosity shear rate index ($\eta$) or the measured viscosity ($\mu$), is measured using a rheometer. In yet another embodiment, the viscometric parameter of the reaction mixture is measured using a rheometer having a cone and plate geometry. Flat plate and concentric cylinder rheometer geometries may also be used under the invention. Viscometric analyses under the present invention are not limited to any particular rheometer geometry.

According to one aspect of the present invention, during molecular sieve synthesis at least one property of the sieve, for example, crystal size or yield, is estimated by comparing one or more values of a measured parameter of the reaction mixture with data from a predetermined relationship between the sieve property and the measured property. The predetermined relationship between the sieve property and the measured property is derived from one or more previous synthesis processes, for example, using the same or substantially the same equipment, and the same or substantially the same reaction mixture and conditions, during which at least one measured property and at least one of the properties of the sieve were correlated as a function of time. Thus, once the system has been calibrated by correlating measured reaction mixture properties with observed molecular sieve properties, the measured reaction mixture properties may serve as a basis for determining the progress of the reaction, with respect to one or more properties of the molecular sieve, during subsequent syntheses.

In the case where the temperature of the reaction mixture/product molecular sieve is not immediately quenched, the reaction vessel will undergo a cooling down period during at least the initial stages of which molecular sieve crystal growth may continue, albeit at a slower rate. In this case, when the reaction endpoint has been signaled, for example, by the measured reaction mixture parameter(s), initiation of the reaction shut-down or quenching may be adjusted to account for the cool-down period.

Other ancillary (for example, non-viscometric) analyses of the reaction mixture may also be performed, for example, by pH measurements, electron microscopy, XRD, scanning electron microscopy (SEM), ultrasound, electrical conductivity, and the like, to provide data that may be used to supplement, support, or confirm a reaction endpoint as derived from viscosity-related data.

For the calibration of a molecular sieve synthesis process according to an aspect of the present invention, the degree of molecular sieve crystallization for a given slurry sample may be directly determined via powder XRD analysis and/or SEM analysis concurrently with measurements of at least one viscometric parameter of the same sample. Thus, a given molecular sieve synthesis process can be calibrated by the temporal correlation of the degree of crystallization, as directly determined by XRD analysis, with the measured viscometric parameter(s).

Values of viscometric parameters, or changes therein, that signal a reaction endpoint may vary depending on factors such as the target molecular sieve, its desired properties, the composition of the reaction mixture, the crystallization conditions, and the like. However, under standardized synthesis conditions for a given molecular sieve product, values of viscometric parameters recorded during the course of the synthesis process are reproducible from preparation to preparation. Therefore, after a given synthesis process for a particular molecular sieve has been calibrated with respect to the time course of the reaction to its endpoint, the calibration data may be used to estimate the endpoint of future runs for making the same product by the same or substantially the same process. Naturally, such processes may be performed under highly standardized conditions, for example, with respect to reaction mixture components, reaction mixture molar ratios, crystallization conditions, reactor size, and the like.

Once the molecular sieve has formed in an appropriate amount and of suitable quality, the solid product may be separated from the reaction mixture by standard mechanical separation techniques such as filtration. The crystals may be water-washed and then dried to obtain the as-synthesized molecular sieve crystals. The drying step can be performed at atmospheric pressure or under vacuum.

In another aspect, the invention is directed to a method for monitoring crystallization of a molecular sieve from a reaction mixture during a molecular sieve synthesis process, the method comprising monitoring at least one viscometric parameter of the reaction mixture; and determining an endpoint of the molecular sieve synthesis process. In one embodiment, the at least one viscometric parameter is selected from the group consisting of viscosity shear rate index, measured viscosity, and combinations thereof. In another embodiment, the endpoint of the molecular sieve synthesis process is determined based on a change in measured viscosity of the reaction mixture, a change in viscosity shear rate index of the reaction mixture, a change in pH of the reaction mixture, and combinations thereof.

In one embodiment, the method for monitoring crystallization during the course of a molecular sieve synthesis process may include monitoring the pH of the reaction mixture, and the monitored pH of the reaction mixture may be used to determine or confirm an endpoint of the molecular sieve synthesis process. The pH of the reaction mixture may also be monitored during crystallization to provide supplemental data for determining or confirming the status of one or more properties of the molecular sieve. The use of pH measurements to monitor crystallization is known in the art. See, for example, J. L. Casci et al., *Zeolites,* 3, 186-187 (1983); B. M. Lowe, *Zeolites,* 3, 300-305 (1983); S. I. Zones, *Zeolites,* 9, 458-467 (1989); and S. I. Zones et al., *Microporous Mesoporous Mater.*, 58, 263-277 (2003).

In general, viscosity shear rate index data of the reaction mixture may be more reproducible from preparation to preparation as compared with measured viscosity data. Determination of the viscosity shear rate index of the reaction mixture provides an additional set of data that can be used alone, or in combination with other (for example, measured viscosity, pH) data, to signal or predict the reaction endpoint. In one embodiment, the monitoring step is discontinued prior to the endpoint of the molecular sieve synthesis process. In one embodiment, the measured viscosity and the viscosity shear rate index of the reaction mixture are measured using a rheometer.

EXAMPLES

The following examples are given to illustrate the present invention. It should be understood, however, that the invention is not to be limited to the specific conditions or details described in these examples.

The examples set forth the synthesis of SSZ-32X which, in comparison with standard SSZ-32, possesses less defined crystallinity, altered Argon adsorption ratios, increased external surface area and reduced cracking activity over other intermediate pore size molecular sieves used for a variety of catalytic processes.

Example 1

Synthesis of SSZ-32X without Seeding

A reaction mixture for the synthesis of SSZ-32X was prepared by adding in sequence to deionized water the following: 45.8% aqueous KOH (M), 0.47M N,N'-diisopropylimidazolium hydroxide (Q), and alumina-coated silica sol 1SJ612 from Nalco (a version with 25 wt. % solids, a $SiO_2/Al_2O_3$ ratio of 35, and acetate as counter-ion). The molar ratios of the reaction mixture components were as follows:

| Components | Molar ratio |
| --- | --- |
| $SiO_2/Al_2O_3$ | 35.0 |
| $H_2O/SiO_2$ | 33.86 |
| $OH^-/SiO_2$ | 0.28 |
| $KOH/SiO_2$ | 0.24 |
| $Q/SiO_2$ | 0.04 |

The reaction mixture was heated to 170° C. over an 8 hour period and continuously stirred at 150 rpm for 135 hours.

The pH and the apparent viscosity of the reaction mixture were monitored throughout the course of the reaction to determine the endpoint of the reaction. The reaction endpoint was realized at a reaction time (at temperature) of about 135 hours.

Figure 1:
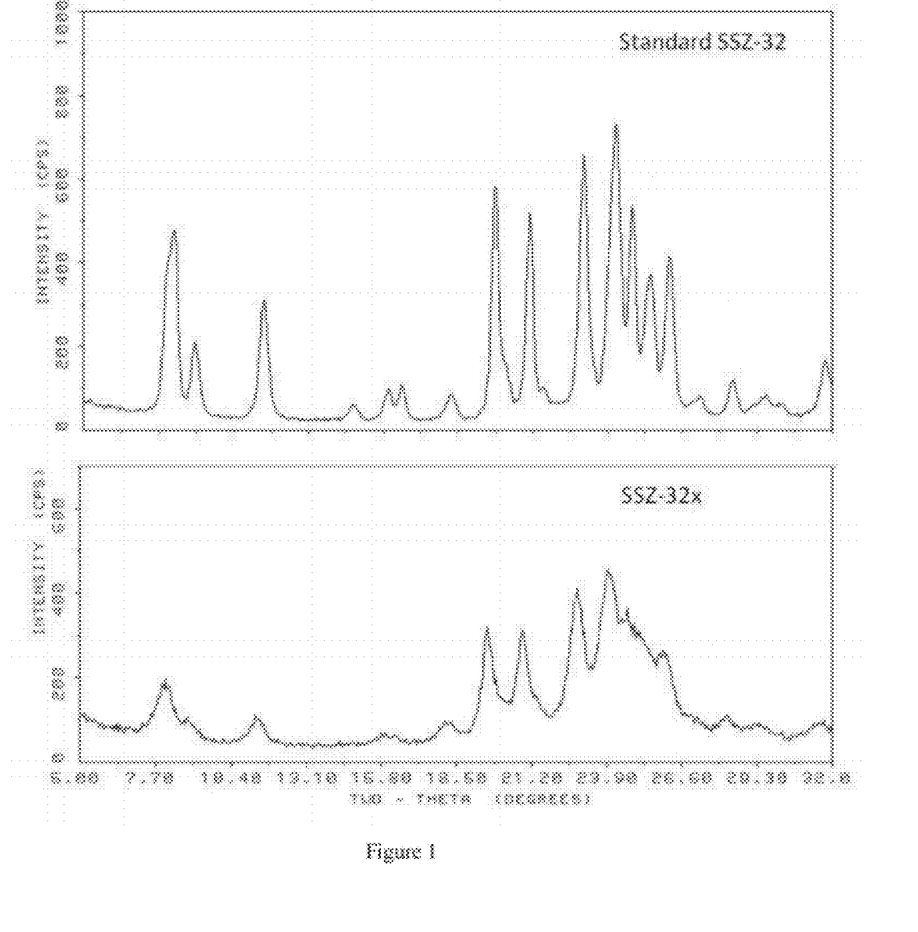
FIG. 1 provides a comparison between the XRD patterns of standard SSZ-32 and small crystal SSZ-32 (hereinafter referred to as SSZ-32X).

Standard SSZ-32 and SSZ-32X have the framework topology designated "MTT" by the International Zeolite Association. SSZ-32X zeolites synthesized according to the present invention may be characterized by their X-ray diffraction (XRD) pattern. Standard SSZ-32 and SSZ-32X may be distinguished by XRD because the XRD pattern broadens as the crystallites are reduced in size. FIG. 1 compares the SSZ-32X peak occurrence and relative intensity with that of standard SSZ-32. The powder XRD lines of Table 1 are representative of calcined standard SSZ-32. The powder XRD lines of Table 2 are representative of calcined SSZ-32X.

TABLE 1

Characteristic XRD Peaks for Calcined Standard SSZ-32

| 2-Theta[a] (Degrees) | d-spacing (Angstroms) | Relative Absolute Intensity (%)[b] |
| --- | --- | --- |
| 7.90[c] | 11.18 | VS |
| 8.12[c] | 10.88 | VS |
| 8.86 | 9.97 | M |
| 11.38 | 7.76 | S |
| 14.60 | 6.06 | W |
| 15.86 | 5.58 | W |
| 16.32 | 5.43 | W |
| 18.12 | 4.89 | W |
| 19.72 | 4.50 | VS |
| 20.96 | 4.24 | VS |
| 22.86 | 3.89 | VS |
| 24.02 | 3.70 | VS |
| 24.62 | 3.61 | S-VS |
| 25.28 | 3.52 | M |
| 25.98 | 3.43 | S |
| 28.26 | 3.16 | W |
| 31.60 | 2.83 | W |
| 35.52 | 2.52 | S |

[a] ±0.20
[b] The powder XRD patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.
[c] These peaks may have significant overlap and are sometimes treated as a single peak.

TABLE 2

Characteristic Peaks for Calcined SSZ-32X

| 2-Theta[a] (Degrees) | d-spacing (Angstroms) | Relative Absolute Intensity (%)[b] |
| --- | --- | --- |
| 8.1 | 10.88 | M |
| 8.9 | 9.88 | W |
| 11.4 | 7.78 | M |
| 16.1 | 5.51 | W |
| 19.8 | 4.49 | VS |
| 21.0 | 4.22 | VS |
| 23.0 | 3.86 | VS |
| 24.2 | 3.67 | VS |
| 25.4 | 3.50 | S |
| 26.1 | 3.41 | S |
| 31.6 | 2.83 | W |
| 35.6 | 2.52 | M |
| 36.7 | 2.45 | W |
| 44.8 | 2.02 | W |

[a] ±0.20
[b] The powder XRD patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic templating agent used in the preparation and from variations in the $SiO_2/Al_2O_3$ molar ratio of various preparations. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ where θ is the Bragg angle, were read from the relative intensities of the peaks (adjusting for background), and d, the interplanar spacing in Angstroms corresponding to the recorded lines, can be calculated.

The product was determined via powder XRD analysis to be SSZ-32X.

Example 2

Synthesis of SSZ-32X with Seeding

A reaction mixture for the synthesis of SSZ-32X was prepared by adding the same components as in Example 1, except SSZ-32X slurry seeds (3.15 wt. % SSZ-32X based on the $SiO_2$ content) were included in the reaction mixture. Seed crystals were obtained from the prior SSZ-32X preparation in Example 1. The molar ratios of the reaction mixture components

| Components | Molar Ratio |
|---|---|
| $SiO_2/Al_2O_3$ | 35.00 |
| $H_2O/SiO_2$ | 31.00 |
| $OH^-/SiO_2$ | 0.27 |
| $KOH/SiO_2$ | 0.23 |
| $Q/SiO_2$ | 0.04 |
| % Seed | 3.15% |

The reaction mixture was heated to 170° C. over an 8 hour period and continuously stirred at 150 rpm for about 65 hours.

During the course of the synthesis reaction, the measured viscosity, viscosity shear rate index, and pH of the reaction mixture were monitored. The reaction endpoint was realized at a reaction time (at temperature) of about 65 hours.

The zeolite sample was calcined to 595° C. and ion-exchanged to the ammonium form as described in U.S. Pat. No. 7,390,763. The sample was pre-heated to 450° C. to remove ammonia before the micropore volume was determined according to ASTM D4365. The product had a micropore volume of 0.035 cc/g. In contrast, standard SSZ-32 has a micropore volume of about 0.06 cc/g.

The product was confirmed by powder XRD analysis to be SSZ-32X. Analysis showed that the product had a $SiO_2/Al_2O_3$ molar ratio of 29.

Example 3

Over-Crystallized SSZ-32X

A reaction mixture for the synthesis of SSZ-32X was prepared by adding the same components as in Example 1, except SSZ-32X seeds (3.15 wt. % based on the $SiO_2$ content) were included in the reaction mixture. The molar ratios of the reaction mixture components were as follows:

| Components | Molar Ratio |
|---|---|
| $SiO_2/Al_2O_3$ | 35.00 |
| $H_2O/SiO_2$ | 31.00 |
| $OH^-/SiO_2$ | 0.27 |
| $M/SiO_2$ | 0.23 |
| $Q/SiO_2$ | 0.04 |
| % Seed | 3.15% |

The reaction mixture was heated to 170° C. over an 8 hour period and continuously stirred at 150 rpm for about 90 hours at 170° C.

The pH and the apparent viscosity of the reaction mixture were monitored throughout the course of the reaction to determine the endpoint of the reaction. The reaction endpoint was realized at a reaction time (at temperature) of about 65 hours but the reaction was allowed to continue for 25 additional hours past the determined endpoint to provide over-crystallized SSZ-32X.

The product was determined via powder XRD analysis to be SSZ-32X.

In a concern that the products of the invention might be a mix of small crystals and considerable amorphous material, the product of Example 3 was analyzed by Transmission Electron Microscopy (TEM). Methods for TEM measurement are disclosed by A. W. Burton et al. in *Microporous Mesoporous Mater.* 117, 75-90, 2009. The microscopy work demonstrated that the product was quite uniformly small crystals of SSZ-32 (the product was SSZ-32X) with very little evidence of amorphous material. The product, as determined TEM measurements, showed elongated crystals with an average length of at least 43 nanometers and an average width of at least 23 nanometers.

Particularly desirable SSZ-32X crystals typically have a crystallite size of no more than 40 nanometers. By contrast, standard SSZ-32 crystals are elongate with an average length of about 170 nanometers.

Determination of Measured Viscosity of Reaction Mixtures

The measured viscosity was determined using standard techniques at atmospheric pressure using a controlled stress rheometer equipped with a cone and plate geometry. Hot slurry samples were taken hourly from the autoclave during the zeolite synthesis process and carefully cooled through a heat exchanger to sub-boiling temperatures before being transferred to a closed container to minimize compositional changes from vapor losses. The sample in the closed container was actively cooled to about 25° C. The same sample may also be used for measuring the viscosity shear rate index and the pH.

Figure 2:
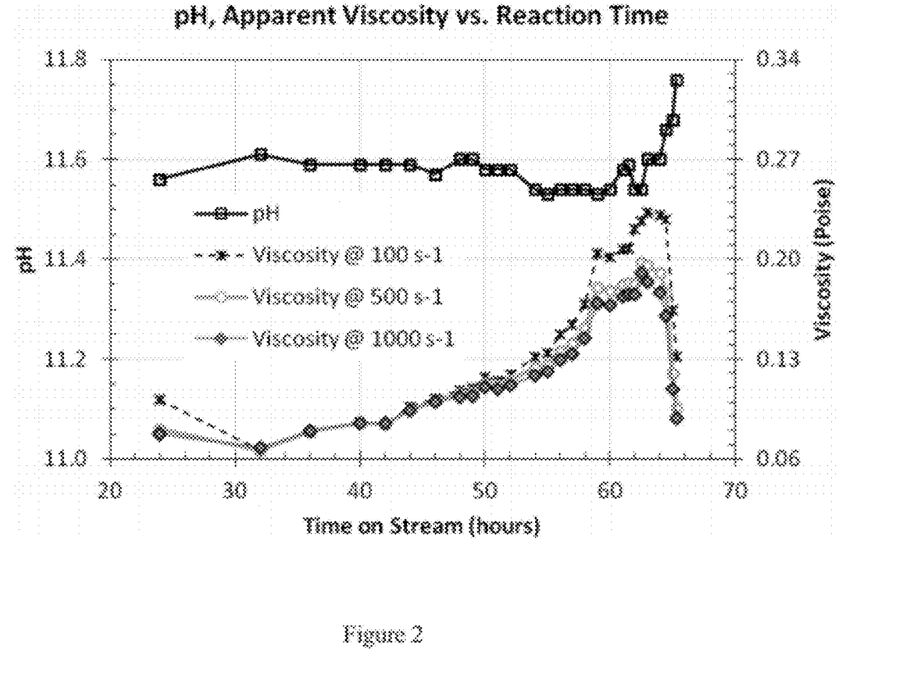
FIG. 2 shows changes in apparent viscosity and pH of slurry samples during a molecular sieve synthesis process.

Each cooled slurry sample was mixed or shaken prior to loading on the rheometer plate to ensure sample homogeneity, and the homogeneity of the sample was maintained after loading by subjecting the sample to a preliminary shear rate of 1000 $s^{-1}$ for at least 30 seconds in order to equilibrate the mixture at 25.0° C. Thereafter, each sample was subjected to shear rates of 100 $s^{-1}$, 200 $s^{-1}$, 500 $s^{-1}$, and 1000 $s^{-1}$ at 25.0° C., and the corresponding shear stress values needed to maintain those shear rates was recorded. The "measured viscosity" of each sample was then determined by dividing the measured shear stress by its corresponding shear rate. The results of measuring the viscosity of the reaction mixture over the course of the SSZ-32X synthesis in Example 2 are shown in FIG. 2.

Determination of Viscosity Shear Rate Index of Reaction Mixtures

The viscosity shear rate index (or rate index, η) of an autoclave reaction mix (slurry) was monitored during the course of zeolite SSZ-32X synthesis in Example 2 by periodically determining the rate index of slurry samples at atmospheric pressure using a controlled stress rheometer equipped with a cone and plate geometry. Hot slurry samples were taken hourly from the autoclave during the zeolite crystallization process and carefully cooled to about 25.0° C.

Each slurry sample was mixed or shaken prior to loading on the rheometer plate to ensure sample homogeneity, and the homogeneity of the sample was maintained after loading by subjecting the sample to a preliminary shear rate of 1000 $s^{-1}$ for at least 30 seconds in order to equilibrate the mixture at 22.0° C. Thereafter, each sample was subjected to a series of increasing shear rates over the range from 100 $s^{-1}$ to 1000 $s^{-1}$ at 25.0° C., and the corresponding shear stress needed to maintain each shear rate was recorded.

Figure 3:
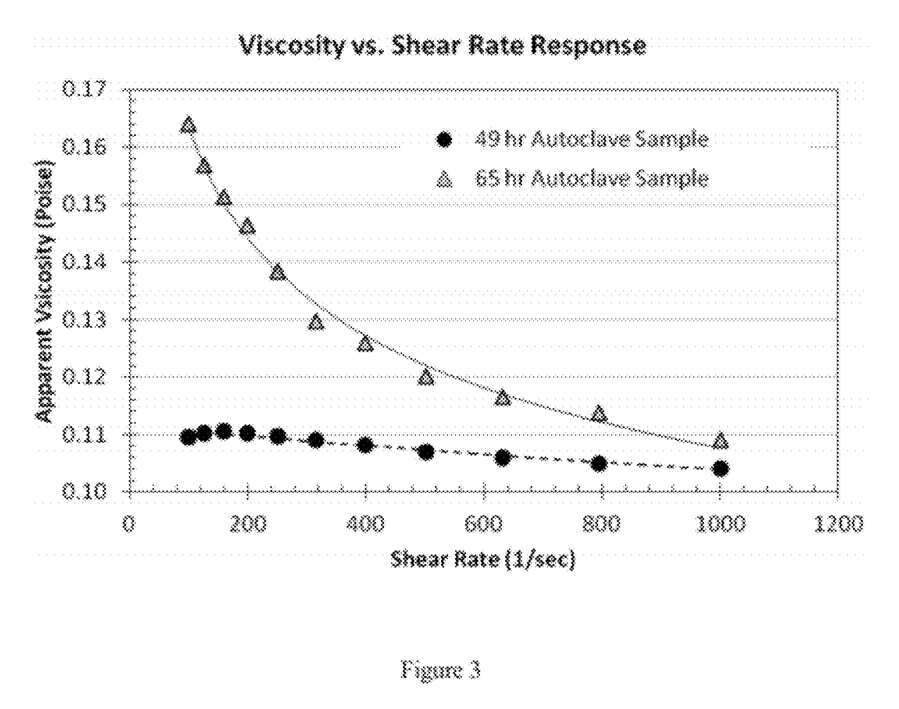
FIG. 3 demonstrates observed differences in the measured viscosity versus shear rate for slurry samples at two different stages of a molecular sieve synthesis.
Figure 4:
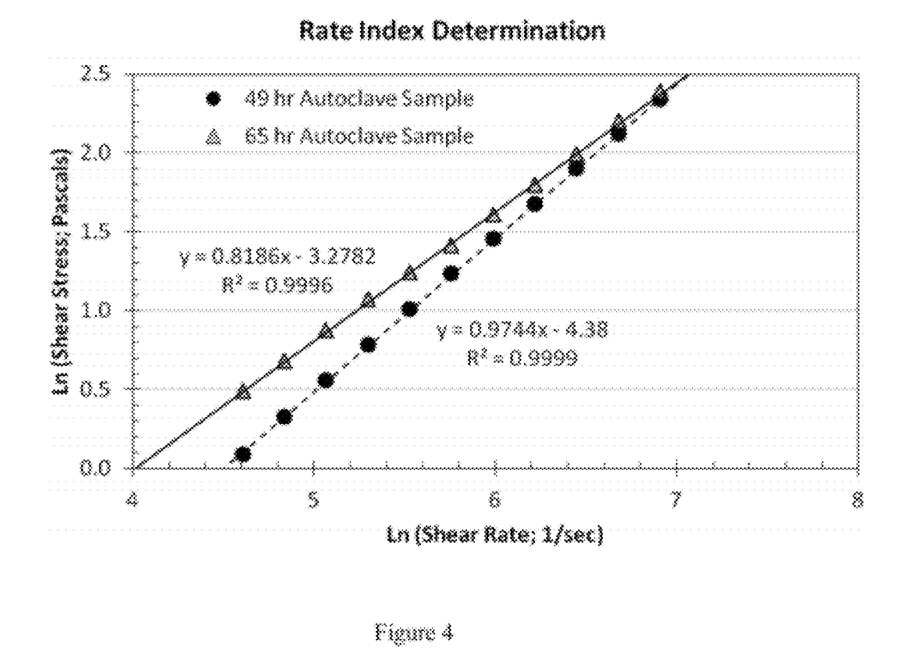
FIG. 4 gives the natural log of the shear stress versus the natural log of the shear rate for slurry samples at two different stages of a molecular sieve synthesis.
Figure 5:
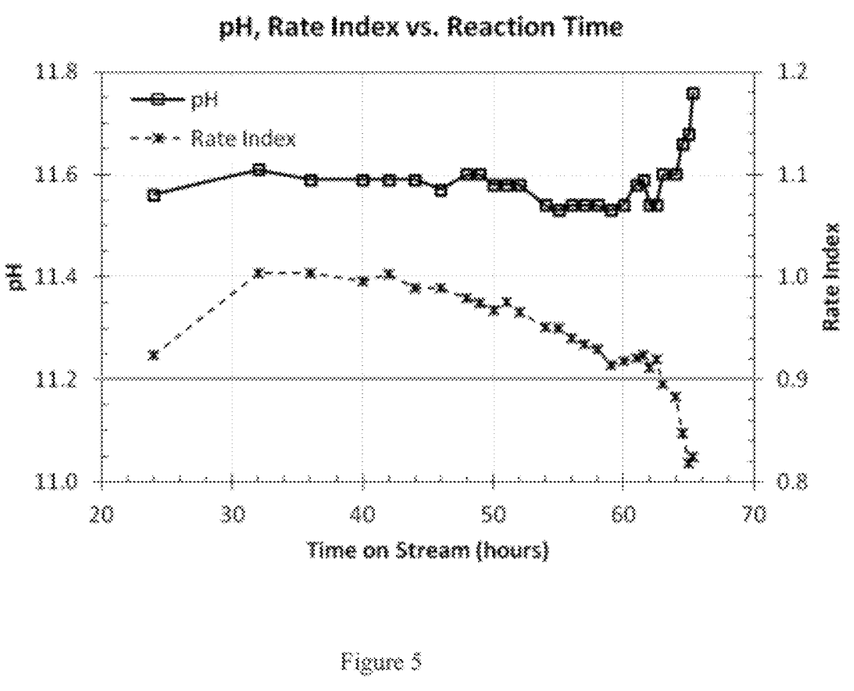
FIG. 5 shows the corresponding changes in viscosity shear rate index and pH of the molecular sieve synthesis process represented in FIG. 2.

At various time points during the course of the reaction, the rheological properties of the slurry samples varied from Newtonian flow to shear thinning or pseudo-plastic flow, depending on the size and number of the zeolite particles and their propensity towards agglomeration (see, e.g., FIG. 3). It can be seen from FIG. 3 that the sample of the reaction mixture taken at 65 hours shows a marked departure from Newtonian flow towards shear-thinning behavior. The degree of departure from Newtonian fluid behavior of the slurry samples was quantified by assuming a Herschel-Bulkley flow model, where the relationship between shear stress ($\sigma$) and shear rate ($\gamma$) is given by $\sigma \alpha \gamma^n$. The Herschel-Bulkley exponent, or viscosity shear rate index ($\eta$), was determined by fitting a straight line to a plot of $\ln(\sigma)$ (Pascals; y-axis) versus $\ln(\gamma)$ ($s^{-1}$; x-axis) (see, for example, FIG. 4). The results for monitoring the viscosity shear rate index of the reaction mixture during zeolite synthesis are shown in FIG. 5. After about 40 hours the rate index began to fall and continued to fall through reaction time of about 65 hours, with the most rapid decrease in rate index occurring between 62 and 65 hours. It can be seen from FIG. 5 that this dramatic decrease in rate index coincided with a sharp increase in measured pH.

Although the invention has been described primarily with respect to autoclave synthesis, aspects of the present invention may also be applicable to continuous processes for zeolite synthesis. Furthermore, although certain aspects of the invention have been described primarily with respect to SSZ-32X, the invention is not limited to SSZ-32X zeolite nor to molecular sieves having the MTT framework. The methods, techniques, and principles described herein may be generally applied to monitoring the synthesis of other zeolites and molecular sieves from suitable reagents and under appropriate crystallization conditions. Such reagents and conditions will generally be known to those artisans of ordinary skill.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one reference. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for synthesizing a molecular sieve comprising at least one tetravalent framework element and at least one trivalent or pentavalent element, comprising:
   a) providing a reaction mixture sufficient to synthesize the molecular sieve;
   b) maintaining the reaction mixture under crystallization conditions;
   c) monitoring at least one viscometric parameter of the reaction mixture,
   wherein the monitoring step comprises:
      (1) periodically removing a sample of the reaction mixture; cooling each sample to a pre-defined temperature; and measuring the at least one viscometric parameter of each sample; or
      (2) periodically removing a sample of the reaction mixture; subjecting each sample to a plurality of shear rates; recording a shear stress corresponding to each of the plurality of shear rates to provide a plurality of shear stress values; and determining a viscosity shear rate index for each sample; and
   d) determining an endpoint based on the monitoring of the at least one viscometric parameter.

2. The method of claim 1, wherein the reaction mixture contains at least 8 wt. % reactant solids.

3. The method of claim 1, wherein the reaction mixture contains at least 10 wt. % reactant solids.

4. The method of claim 1, wherein the at least one viscometric parameter is selected from the group consisting of viscosity shear rate index, measured viscosity, and combinations thereof.

5. The method of claim 1, wherein the endpoint is determined based on a change in measured viscosity of the reaction mixture, a change in viscosity shear rate index of the reaction mixture, or combinations thereof.

6. The method of claim 1, wherein the molecular sieve synthesized is an aluminasilica.

* * * * *